United States Patent
Powell et al.

(10) Patent No.: US 11,105,181 B2
(45) Date of Patent: Aug. 31, 2021

(54) THROUGH TUBING BRIDGE PLUG HAVING HIGH EXPANSION ELASTOMER DESIGN

(71) Applicant: Halliburton Energy Services, Inc., Houston, TX (US)

(72) Inventors: Bryan Powell, Van Alstyne, TX (US); Pramod Chamarthy, Frisco, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/485,372

(22) PCT Filed: Dec. 21, 2018

(86) PCT No.: PCT/US2018/067309
§ 371 (c)(1),
(2) Date: Aug. 12, 2019

(87) PCT Pub. No.: WO2020/131118
PCT Pub. Date: Jun. 25, 2020

(65) Prior Publication Data
US 2020/0217171 A1 Jul. 9, 2020

(51) Int. Cl.
*E21B 33/134* (2006.01)
*E21B 33/128* (2006.01)
(Continued)

(52) U.S. Cl.
CPC .......... *E21B 33/134* (2013.01); *E21B 33/128* (2013.01); *E21B 33/136* (2013.01); *F16J 15/3236* (2013.01)

(58) Field of Classification Search
CPC .... E21B 33/128; E21B 33/134; E21B 33/136; F16J 15/3236
(Continued)

(56) References Cited

U.S. PATENT DOCUMENTS 4,234,197 A * 11/1980 Amancharla ............ F16J 15/20
244/124
5,010,958 A * 4/1991 Meek .................. E21B 33/1265
166/382
(Continued)

OTHER PUBLICATIONS

International Search Report and Written Opinion dated Sep. 20, 2019 issued in International Patent Application No. PCT/US2018/067309.

*Primary Examiner* — Nicole Coy
(74) *Attorney, Agent, or Firm* — McGuire Woods, LLP

(57) ABSTRACT

A high expansion bridge plug comprising an elastomer element assembly and a control assembly for generating a compressive force against the elastomer element assembly. The elastomer element assembly comprises a first element stack and a second element stack with the first element stack comprising a first grouping of male and female elements and the second element stack comprising a second grouping of male and female elements. The compressive force generated causes the male element and the female element to expand and the female element to at least partially swallow the male element. The male and female elements can be conical shape, and an angle of a conical element can be between 5-25 degrees, and the length of the top female element is greater than the length of the middle or bottom male element.

20 Claims, 4 Drawing Sheets

(51) Int. Cl.
*E21B 33/136* (2006.01)
*F16J 15/3236* (2016.01)

(58) Field of Classification Search
USPC ............... 277/337, 338, 342, 603, 605, 607
See application file for complete search history.

(56) References Cited

U.S. PATENT DOCUMENTS

| | | | | |
|---|---|---|---|---|
| 5,678,635 | A * | 10/1997 | Dunlap | .................... E21B 23/01 |
| | | | | 166/123 |
| 6,318,461 | B1 | 11/2001 | Carisella | |
| 6,827,150 | B2 * | 12/2004 | Luke | .................... E21B 33/1208 |
| | | | | 166/387 |
| 7,128,145 | B2 | 10/2006 | Mickey | |
| 7,401,788 | B2 * | 7/2008 | Williams | ................ F16J 15/181 |
| | | | | 277/342 |
| 8,403,036 | B2 * | 3/2013 | Neer | ..................... E21B 33/128 |
| | | | | 166/118 |
| 9,051,812 | B2 | 6/2015 | Clemens et al. | |
| 10,087,705 | B2 * | 10/2018 | Atkins | ................... E21B 33/126 |
| 2003/0222410 | A1 * | 12/2003 | Williams | ............. E21B 33/1208 |
| | | | | 277/619 |
| 2004/0069502 | A1 | 4/2004 | Luke | |
| 2004/0149429 | A1 | 8/2004 | Dilber et al. | |
| 2010/0288512 | A1 | 11/2010 | Rinberg et al. | |
| 2018/0171749 | A1 | 6/2018 | Yue et al. | |

* cited by examiner

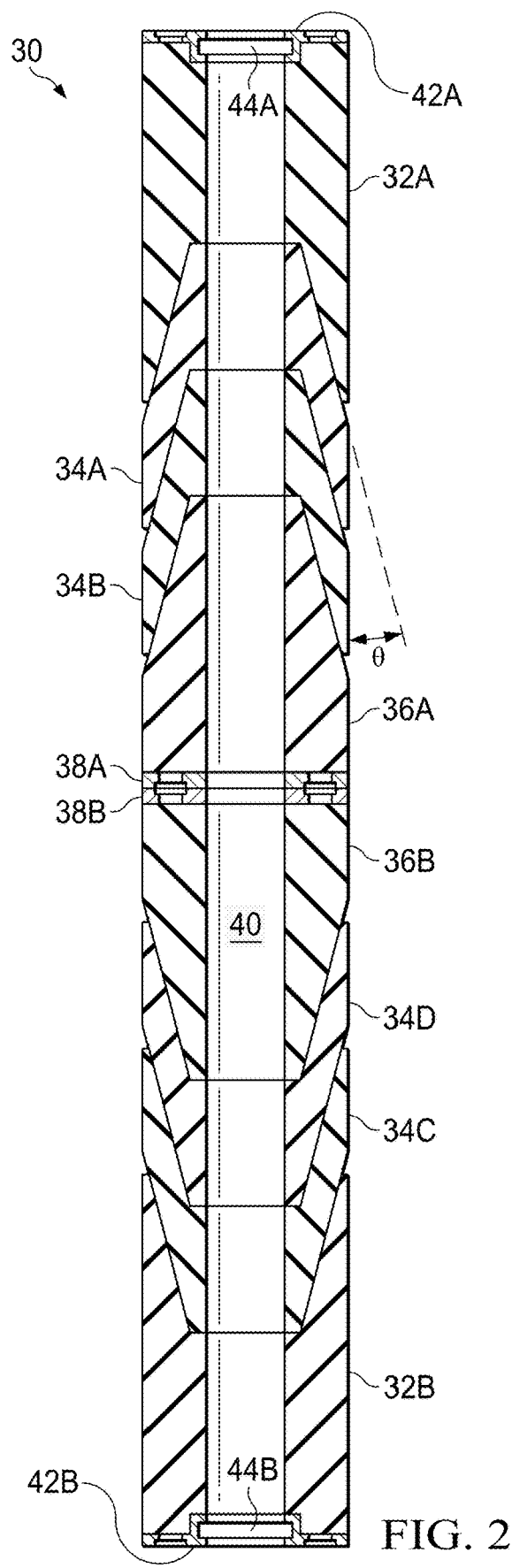
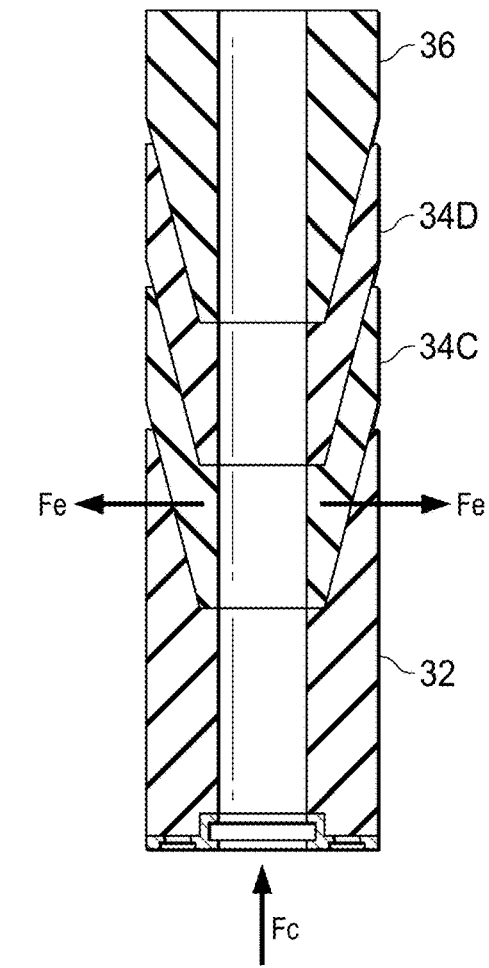
FIG. 3
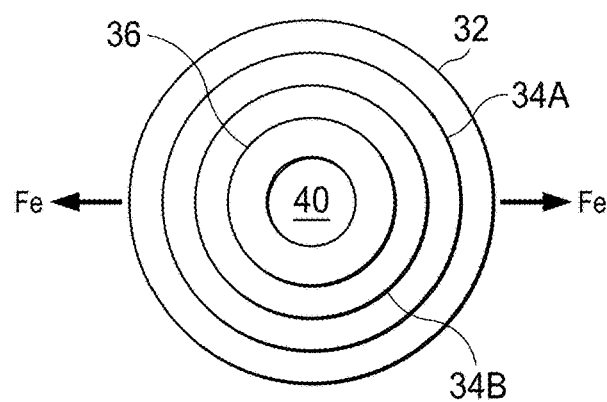
FIG. 4
FIG. 2

THROUGH TUBING BRIDGE PLUG HAVING HIGH EXPANSION ELASTOMER DESIGN

TECHNICAL FIELD OF THE INVENTION

The present disclosure relates, in general, to maintenance and development of downhole wellbores during hydrocarbon reservoir exploration and development and, in particular, to a bridge plug having a high expansion elastomer design.

BACKGROUND

Through tubing bridge plugs are characterized by very large expansion ratios, typically ranging from 300% up to 600% or even more. Current industry practice for creating a positive seal with such large expansion ratios is to increase the amount of elastomer used. This in turn either increases the overall length of the plug and/or increases the required amount of setting force. Increasing the length of the plug would create practical problems in the field requiring expensive mitigation options. The setting force cannot be increased beyond a certain value due to structural and/or geometric limitations.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 2 is an illustration of an elastomer element assembly with enhanced geometric design for use with a through tubing bridge plug, in accordance with certain example embodiments;

FIG. 3 is an illustration of an element stack of the elastomer element assembly, in accordance with certain example embodiments;

FIG. 4 is an illustration of a ring of stacks when the elastomer assembly is fully activated, in accordance with certain example embodiments;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The elastomer geometry of the Through Tubing Bridge Plug (TTBP) presented herein provides a means to achieve a reliable, high expansion ratio leak-free seal while minimizing the length of the elastomer required, as well as the setting force required. For example, the elastomer geometry allows for a new shortened TTBP design. The new TTBP can have about 1.69" run-in-hole diameter which can set in a 7" casing. The elastomer geometry allows for the shortest TTBP in the market, by a wide margin. The shorter length enables faster/cheaper rig up. Also, the time required to set the plug is cut in half. It also enables the plug to be run on Slickline, Digital Slick line, Wireline, wired drill pipe, MWD/LWD, and downhole tractors.

The new geometry of the elastomer assembly includes: two stacks of nesting elements, with the nested elements of one stack facing the other; and each stack consisting of a bottom, at least one middle element and a top element. The elements can have matching male and female conical or cupped shapes to nest within each other during run in hole condition. The angle of the conical shape is between 5-25 degrees, which is optimized for low setting force. The top and bottom elements have ID (Inside Diameter) constraining features bonded to one of the sides to control deformation and prevent leak paths. The ID constraining features on the top elements can have O-rings to seal the elastomer assembly with an actuator rod of the TTBP. ID constraining features on the top elements prevent radial expansion of the top edge of the top element. The top element swallows the middle elements when fully energized and creates a positive seal with perforation in wellbore casing. Top element length is optimized to swallow the mid and center elements completely. The length of the top element is between 3-4.5 inches. This is a function of the Casing ID, Element OD and the number of middle and end elements.

Figure 1:
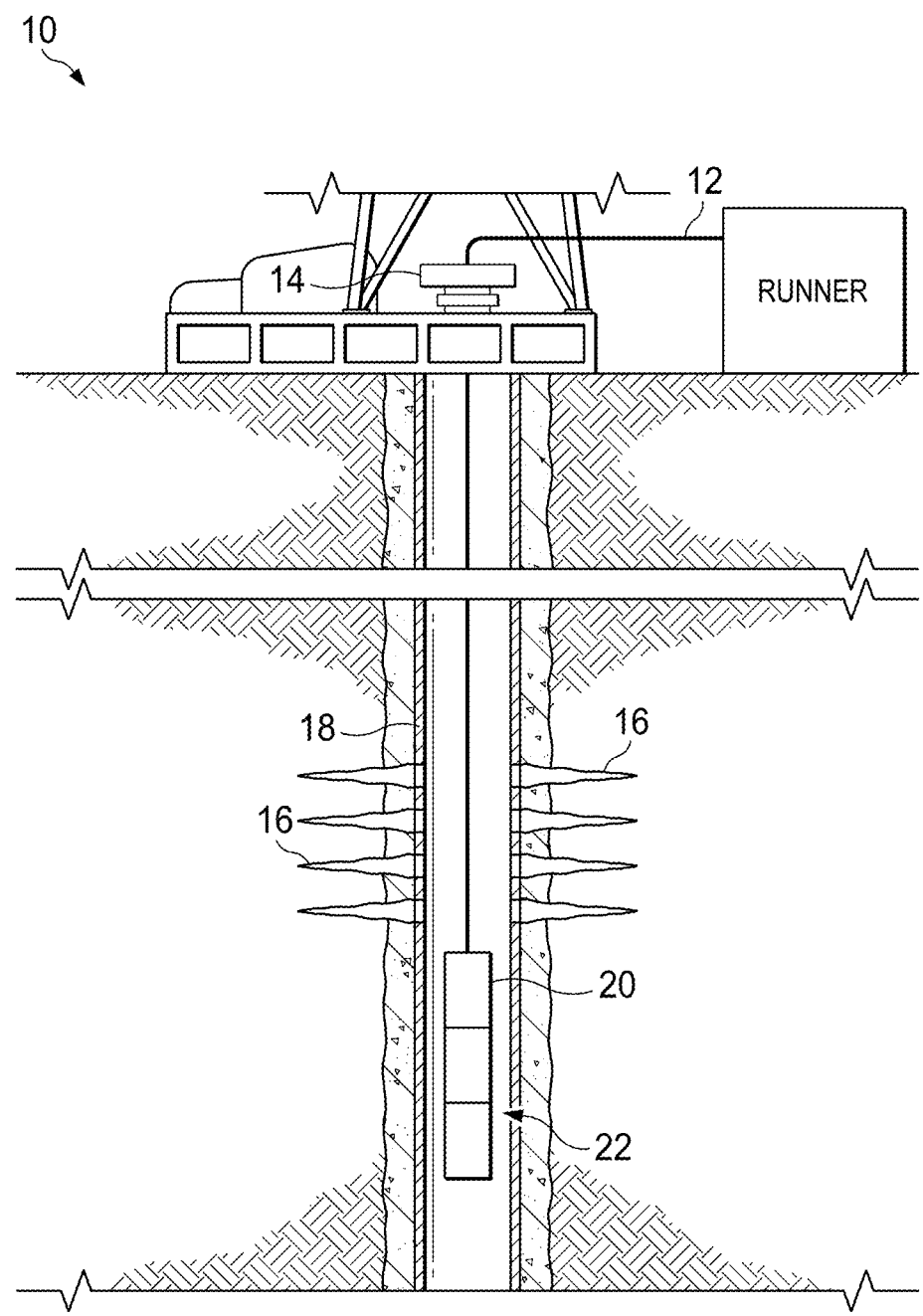
FIG. 1 is an illustration of a well operations site during the installation of a through tubing bridge plug, in accordance with certain example embodiments.

Referring to FIG. 1, illustrated is a well operations site during the installation of a TTBP, denoted generally as 10. The site 10 includes a runner for running a cable 12, such as a slickline, for delivering and retrieving a running tool through a well head 14 and down well casing 18. The well casing includes perforation 16 in the well casing. During production, the casing 18 is perforated in order to access hydrocarbon deposits. As a reservoir matures, production can drop and the well is developed further to access deposits elsewhere in the wellbore. Before the other deposits can be accessed for production, the perforations 16 need to be plugged. On the end of the cable 12 is a running tool that includes a power unit 20 and a TTBP 22 for plugging perforations 16. For sake of brevity, FIG. 1 is a simplified view that focuses on the operations of the running tool or setting tool and does not describe other features of the wellbore that may be involved, such as multiple well casing sections and packers used to seal the sections. However, in operation, the TTBP is anchored to the well casing 18 at a perforation location and the power unit 20 is used to create a compressive force against the TTBP 22 causing an elastomer assembly to expand and plug the perforation 16.

Figure 5A:
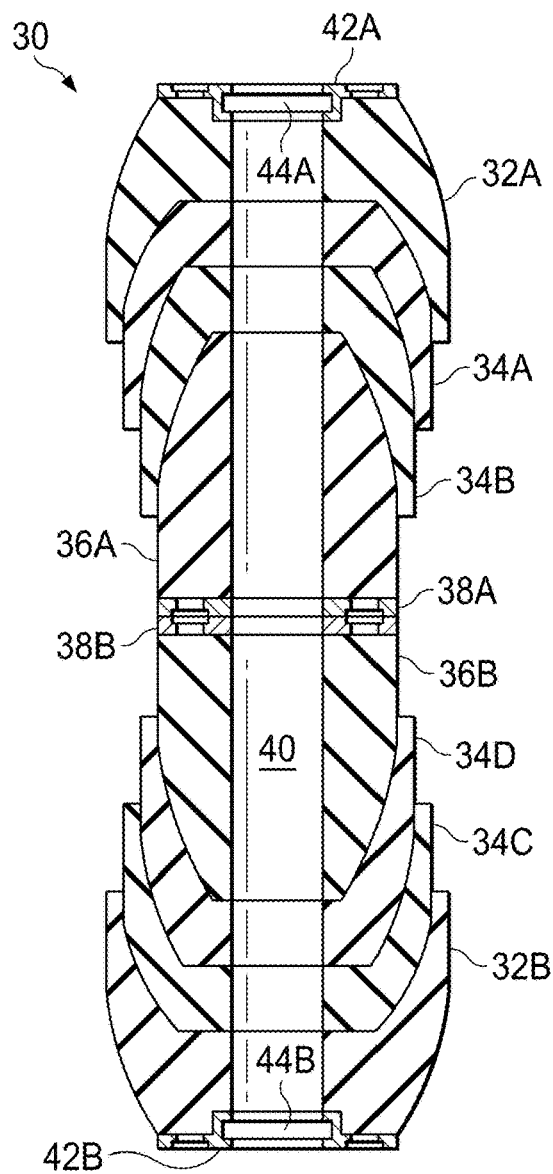
FIGS. 5A and 5B are illustrations of the stack elements during various states of elastomer assembly activation, in accordance with certain example embodiments.
Figure 5B:
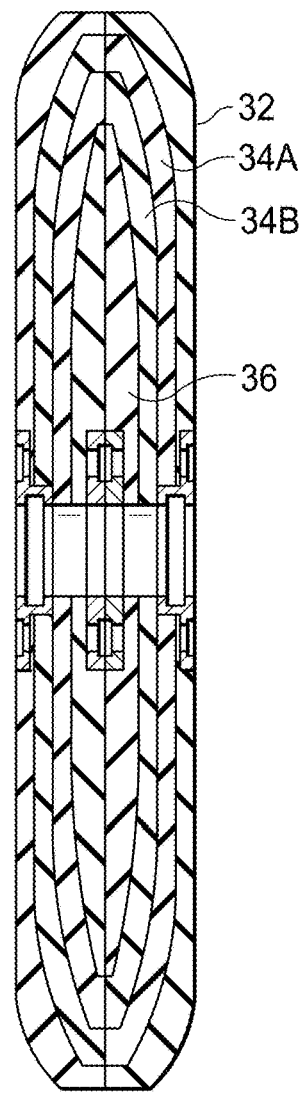

Referring now to FIG. 3, illustrated is a stack of the elastomer element assembly 30, in accordance with certain example embodiments. As a compressive force, $F_c$, is applied, the arrangement of the nested elements creates an expanding force, $F_e$, resulting in the top element 32 swallowing the middles elements 34C, D and the bottom element 36D. FIG. 4 simply illustrates that when the assembly 30 is fully activated, the geometric design allows the expanded elastomer to have a more uniform shape without extensive folding between the elements. FIGS. 5A and 5B illustrate the swallowing of the elements during the state of activation and the high elastomer configuration at full activation. The geometric design of the elastomer provides for a better TTBP. Obviously, deactivation of the TTBP allows the elastomer to return unexpanded state.

Figure 6:
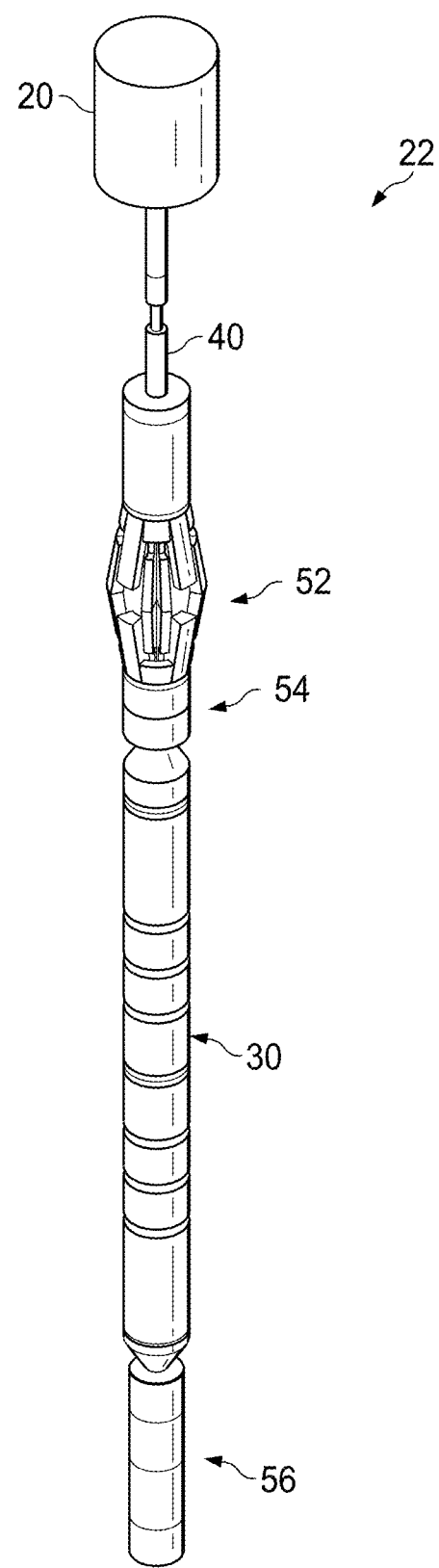
FIG. 6 is an illustration of a through tubing bridge plug with elastomer assembly for use in a wellbore, in accordance with certain example embodiments.

Referring to FIG. 6, illustrated is TTBP 22 with elastomer assembly 30 for use in a wellbore, in accordance with certain example embodiments. TTBP 22 is coupled to power unit 20 through an actuator rod 40. The power unit 20 provides the compressive force necessary to create the expansion in the elastomer assembly 30. Primarily, the TTBP 22 includes an anchor assembly 52. The anchor assembly 52 is used to anchor the TTBP 22 to a side of the well casing 18 after the TTBP 22 has been inserted in a perforation 16. A set of compression assemblies 52, 56 assist in providing a compressive force against the elastomer assembly 30 which in response expands to create a positive seal with the perforation 16.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a high expansion bridge plug for use in a wellbore, the high expansion plug comprising: an elastomer element assembly having a series of male and female elements; and a control assembly for generating a compressive force against the elastomer element assembly; wherein the compressive force generated causes the male element and the female element to expand and the female element to at least partially swallow the male element;

Clause 2, the bridge plug of clause 1 wherein the elastomer element assembly includes a top female element and a bottom male element and at least one middle element, wherein the top female element receives the middle element and the middle element receives the bottom male element;

Clause 3, the bridge plug of clause 2 wherein the elastomer element assembly includes at least one of a constraint and O-ring coupled to the top female element and at least one of another constraint and O-ring coupled to the bottom male element;

Clause 4, the bridge plug of clause 1 wherein the elastomer element assembly comprises a first element stack and a second element stack with the first element stack comprising a first grouping of male and female elements and the second element stack comprising a second grouping of male and female elements;

Clause 5, the bridge plug of clause 4 wherein the first and second grouping each includes a top female element and a bottom male element and at least one middle element, wherein the top female element receives the middle element and the middle element receives the bottom male element;

Clause 6, the bridge plug of clause 5 wherein the elastomer element assembly includes at least one of a constraint and O-ring coupled to the top female element and at least one of another constraint and O-ring coupled to the bottom element;

Clause 7, the bridge plug of clause 1 wherein the control assembly comprises an actuation rod and at least one compression assembly, and the elastomer element assembly is slidably disposed about the actuation rod;

Clause 8, The bridge plug of clause 1 wherein the male and female elements have cup or conical shapes;

Clause 9, the bridge plug of clause 1 wherein an angle of an element of the assembly is between 5-25 degrees;

Clause 10, wherein the length of the top female element is greater than the length of the middle or bottom male element;

Clause 11, a high expansion bridge plug for use in a wellbore, the plug comprising: an elastomer element assembly having a series of male and female elements, wherein compressive force generated from a control assembly causes the male element and the female element to expand and the female element to surround the male element;

Clause 12, the bridge plug of clause 11 wherein the elastomer element assembly comprises a first element stack and a second element stack with the first element stack comprising a first grouping of male and female elements and the second element stack comprising a second grouping of male and female elements;

Clause 13, the bridge plug of clause 12 wherein the first and second grouping each includes a top female element and a bottom male element and at least one middle element, wherein the top female element receives the middle element and the middle element receives the bottom male element;

Clause 14, the bridge plug of clause 12 wherein the elastomer element assembly includes at least one of a constraint and O-ring coupled to the top female element and at least one of another constraint and O-ring coupled to the bottom male element;

Clause 15, the bridge plug of clause 11 wherein the male and female elements have cup or conical shapes;

Clause 16, the bridge plug of clause 11 wherein an angle of an element of the assembly is between 5-25 degrees;

Clause 17, the bridge plug of clause 11 wherein the length of the top female element is greater than the length of the middle or bottom element;

Clause 18, a method for plugging a perforation in a wellbore, the method comprising: placing a high expansion bridge plug on a wireline; running the high expansion bridge plug into the wellbore; plugging the perforation; wherein the high expansion bridge plug includes: a first grouping of male and female elements; a second grouping of male and female elements coupled to the second grouping of male and female elements; and wherein the first and second grouping include a top female element, a bottom male element, and at least one element there between; wherein the high expansion bridge plug is coupled to a control assembly and in response to a compressive force generated from the control assembly the bridge plug compresses and the groupings of elements expand causing the female elements to surround the male elements;

Clause 19, the system of clause 18 wherein an angle of an element of the plug is between 5-25 degrees; and Clause 20, the system of clause 18 wherein the length of the top female element is greater than the length of the middle or bottom male element.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A high expansion bridge plug for use in a wellbore, the high expansion plug comprising:
    a first element stack comprising a first series of male and female elements;
    a second element stack comprising a second series of other male and other female elements; and
    a control assembly having an actuator rod for generating a compressive force against the the first element stack and the second element stack, the control assembly coupled to a power unit;
    wherein the compressive force generated causes the male elements and the female elements to expand and the female elements to at least partially encompass the male elements;
    wherein the first element stack includes a first constraint coupled to a top female element of the first series and the actuator rod and a second constraint coupled to a bottom element of the first series;
    wherein the second element stack includes a third constraint coupled to a top female element of the second series and the actuator rod and a fourth constraint coupled to a bottom element of the second series;
    wherein the constraints bound the first element stack to the second element stack, control nesting and expansion of the elements, and control leak paths;
    wherein the first series further comprises: the top female element and the bottom element and at least one middle element, wherein the top female element receives the middle element and the middle element receives the bottom element; and wherein the second series comprises: the other top female element and the other bottom element and at least one other middle element, wherein the other top female element receives the other middle element and the other middle element receives the other bottom element.

2. The bridge plug of claim 1 wherein the first series comprises a first O-ring coupled to the top female element and the actuator rod and a second O-ring coupled to the bottom element and the actuator rod and the second series comprises a third O-ring coupled to the other top female element and the actuator rod and fourth O-ring coupled to the other bottom element and the actuator rod.

3. The bridge plug of claim 1 wherein the first and second series includes an O-ring coupled to the top female element and the actuator rod and another O-ring coupled to the bottom element.

4. The bridge plug of claim 1 wherein the control assembly comprises the actuator rod and at least one compression assembly, and the first element stack and the second element stack are slidably disposed about the actuator rod.

5. The bridge plug of claim 1 wherein the male and female elements have cup or conical shapes.

6. The bridge plug of claim 1 wherein an angle of an element of the assembly is between 5-25 degrees.

7. The bridge plug of claim 1 wherein the length of the top female element is greater than the length of the middle or bottom element, wherein the length of the top female element is between 3 to 4.5 inches.

8. A high expansion bridge plug for use in a wellbore, the plug comprising:
    a first element stack comprising a first series of male and female elements;
    a second element stack comprising a second series of other male and other female elements;
    wherein compressive force generated from a control assembly causes the male elements and the female elements to expand and the female elements to surround the male elements;
    wherein the first element stack includes a first constraint coupled to a top female element of the first series and an actuator rod and a second constraint coupled to a bottom element of the first series;
    wherein the second element stack includes a third constraint coupled to a top female element of the second series and the actuator rod and a fourth constraint coupled to a bottom element of the second series;
    wherein the constraints bound the first element stack to the second element stack, control nesting and expansion of the elements, and control leak paths; and
    wherein the first series further comprises: the top female element and the bottom element and at least one middle element, wherein the top female element receives the middle element and the middle element receives the bottom element; and wherein the second series comprises: the other top female element and the other bottom element and at least one other middle element, wherein the other top female element receives the other middle element and the other middle element receives the other bottom element.

9. The bridge plug of claim 8 wherein the first series includes a first O-ring coupled to the top female element and the actuator rod and another O-ring coupled to the bottom element and the second series includes third O-ring coupled to the other top female element and the actuator rod and fourth O-ring coupled to the other bottom element.

10. The bridge plug of claim 8 wherein the male and female elements have cup or conical shapes.

11. The bridge plug of claim 8 wherein an angle of at least one element selected from a group consisting of the first series of male and female elements and the second series comprising the second series of male and female elements is between 5-25 degrees.

12. The high expansion bridge plug of claim 8 wherein the length of the top female element is greater than the length of the bottom element, wherein the length of the top female element is between 3 to 4.5 inches.

13. A method for plugging a perforation in a wellbore, the method comprising:
    placing a high expansion bridge plug on a wireline;
    running the high expansion bridge plug into the wellbore;
    plugging the perforation;
    wherein the high expansion bridge plug includes:
        a first element stack comprising a first series of male and female elements;
        a second element stack comprising a second series of other male and other female elements; and a control assembly having an actuator rod for generating a compressive force against the the first element stack and the second element stack, the control assembly coupled to a power unit;

wherein the compressive force generated causes the male elements and the female elements to expand and the female elements to at least partially encompass the male elements;

wherein the first element stack includes a first constraint coupled to a top female element of the first series and the actuator rod and a second constraint coupled to a bottom element of the first series;

wherein the second element stack includes a third constraint coupled to a top female element of the second series and the actuator rod and a fourth constraint coupled to a bottom element of the second series;

wherein the constraints bound the first element stack to the second element stack, control nesting and expansion of the elements, and control leak paths;

wherein the first series further comprises: the top female element and the bottom element and at least one middle element, wherein the top female element receives the middle element and the middle element receives the bottom element; and wherein the second series comprises: the other top female element and the other bottom element and at least one other middle element, wherein the other top female element receives the other middle element and the other middle element receives the other bottom element.

14. The system of claim 13 wherein an angle of an element of the plug is between 5-25 degrees.

15. The system of claim 13 wherein the length of the top female element is greater than the length of the bottom element.

16. The method of claim 13 wherein the first series comprises a first O-ring coupled to the top female element and the actuator rod and a second O-ring coupled to the bottom element and the actuator rod and the second series comprises a third O-ring coupled to the other top female element and the actuator rod and fourth O-ring coupled to the other bottom element and the actuator rod.

17. The method of claim 13 wherein the first and second series includes an O-ring coupled to the top female element and the actuator rod and another O-ring coupled to the bottom element.

18. The method of claim 13 wherein the control assembly comprises the actuator rod and at least one compression assembly, and the first element stack and the second element stack are slidably disposed about the actuator rod.

19. The method of claim 13 wherein the male and female elements have cup or conical shapes.

20. The method of claim 13 wherein the length of the top female element is greater than the length of the middle or bottom element, wherein the length of the top female element is between 3 to 4.5 inches.

* * * * *